US011266262B2

(12) United States Patent
Pappas

(10) Patent No.: US 11,266,262 B2
(45) Date of Patent: *Mar. 8, 2022

(54) PACKAGE SECURING SYSTEM AND METHOD THAT PROTECTS DELIVERED PACKAGES FROM THEFT

(71) Applicant: Cary C Pappas, Collierville, TN (US)

(72) Inventor: Cary C Pappas, Collierville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/003,311

(22) Filed: Aug. 26, 2020

(65) Prior Publication Data

US 2020/0390313 A1    Dec. 17, 2020

Related U.S. Application Data

(63) Continuation-in-part of application No. 16/406,398, filed on May 8, 2019, now Pat. No. 10,786,104.

(51) Int. Cl.
*A47G 29/22* (2006.01)
*A47L 23/26* (2006.01)
*H04N 7/18* (2006.01)
*G05B 11/01* (2006.01)
*E05B 65/00* (2006.01)
*A47G 29/20* (2006.01)
(Continued)

(52) U.S. Cl.
CPC .......... *A47G 29/22* (2013.01); *A47G 29/124* (2013.01); *A47G 29/141* (2013.01); *A47G 29/20* (2013.01); *A47L 23/263* (2013.01); *E05B 65/00* (2013.01); *G05B 11/01* (2013.01); *H04N 7/185* (2013.01); *A47G 2029/1257* (2017.08); *A47G 2029/145* (2013.01); *A47G 2029/147* (2013.01); *A47G 2029/149* (2013.01)

(58) Field of Classification Search
CPC ...... A47G 29/124; A47G 29/20; A47G 29/22; A47G 29/14; A47G 29/16; A47G 29/141; A47G 2029/1257; A47G 2029/144; A47G 2029/147; A47G 2029/148; A47G 2029/149; A47G 27/0293; A47G 2029/145; B65D 29/04; A47L 23/263; A47L 23/266; H04N 7/185; G05B 11/01; E05B 65/00
USPC ............... 232/19, 38, 45; 340/569; 383/117; 428/74; 348/143; 70/63, 64
See application file for complete search history.

(56) References Cited

U.S. PATENT DOCUMENTS 10,076,204 B1    9/2018  Sadeghi
10,299,617 B1    5/2019  Castellanos
(Continued)

*Primary Examiner* — William L Miller
(74) *Attorney, Agent, or Firm* — H. Brock Kolls

(57) ABSTRACT

The present invention relates a package securing system that protects delivered packages from theft. The system comprising a frame that defines an interior region receives a mat. The frame having a recessed chamber. A securing rail is operationally related to the frame and repositionable. A security tarp having at least a portion secured to the frame and at least a portion secured by the securing rail, the security tarp is stored in the recessed chamber. When a package is placed on the mat the package is secured by repositioning the securing rail extending the security tarp over the package. A camera establishes an optical motion free zone around the package and data communicates a secure package notification to predefined recipients when motion is detected, a package delivery or package delivery exception occurs by a package delivery person, or in response to a space-available request.

20 Claims, 12 Drawing Sheets

(51) Int. Cl.
*A47G 29/124* (2006.01)
*A47G 29/14* (2006.01)

(56) References Cited

U.S. PATENT DOCUMENTS

| | | | |
|---|---|---|---|
| 10,537,197 | B2 | 1/2020 | Hopp |
| 10,973,353 | B2* | 4/2021 | Parvarandeh ........... E05B 65/06 |
| 2005/0040954 | A1 | 2/2005 | McNally |
| 2009/0273670 | A1 | 11/2009 | Tamayo |
| 2010/0277328 | A1 | 11/2010 | Mullan |
| 2016/0051073 | A1 | 2/2016 | Heinz |
| 2017/0178117 | A1 | 6/2017 | McClard |
| 2018/0296016 | A1 | 10/2018 | Teoh |
| 2019/0104876 | A1 | 4/2019 | Loures |
| 2019/0130342 | A1 | 5/2019 | Maheshwari |
| 2019/0133362 | A1 | 5/2019 | Gilligan |
| 2020/0060460 | A1 | 2/2020 | Farrar |
| 2020/0077826 | A1* | 3/2020 | Chenier ............. G07C 9/00309 |
| 2020/0170434 | A1* | 6/2020 | Lemieux ................ A47G 29/20 |

* cited by examiner

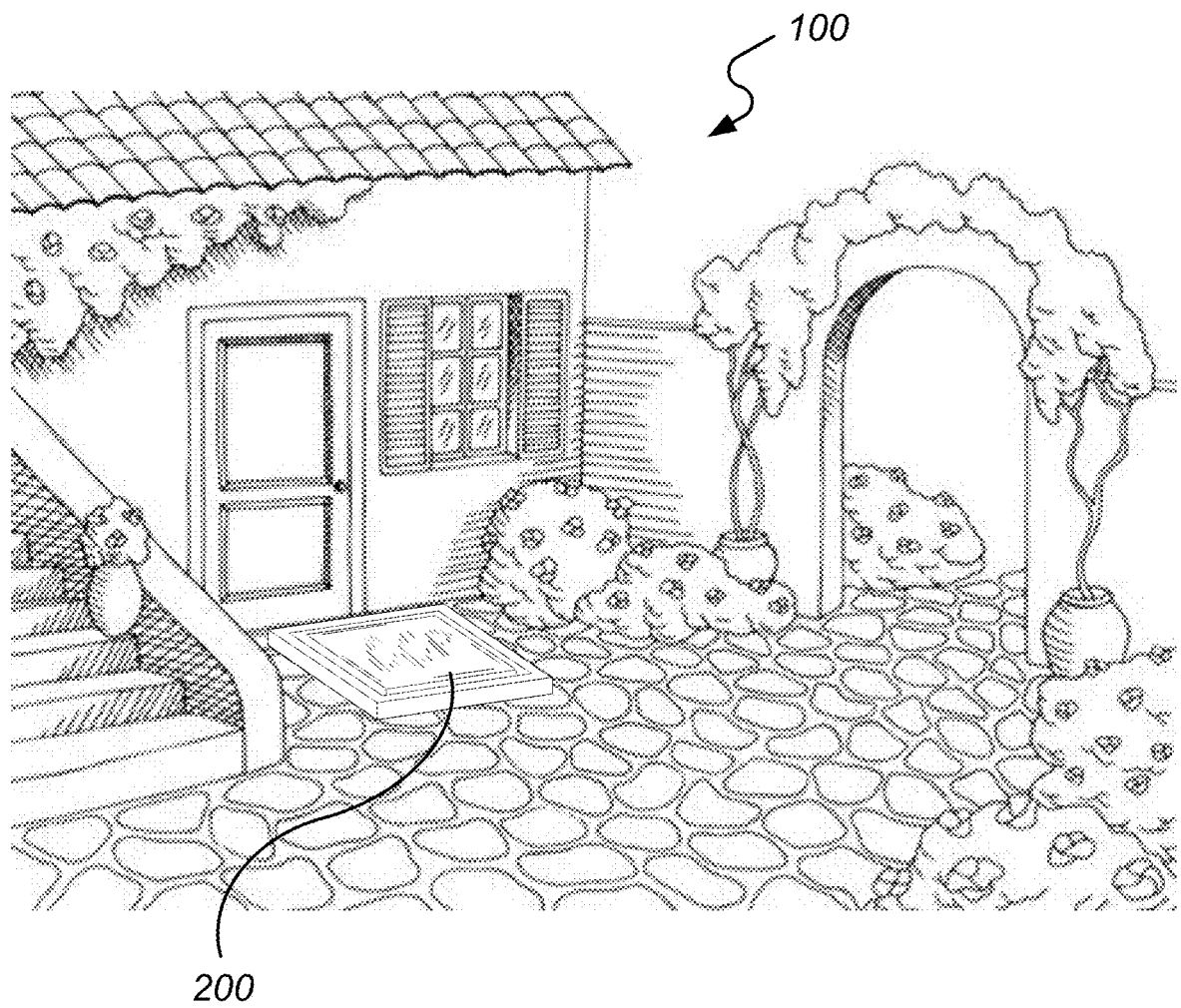
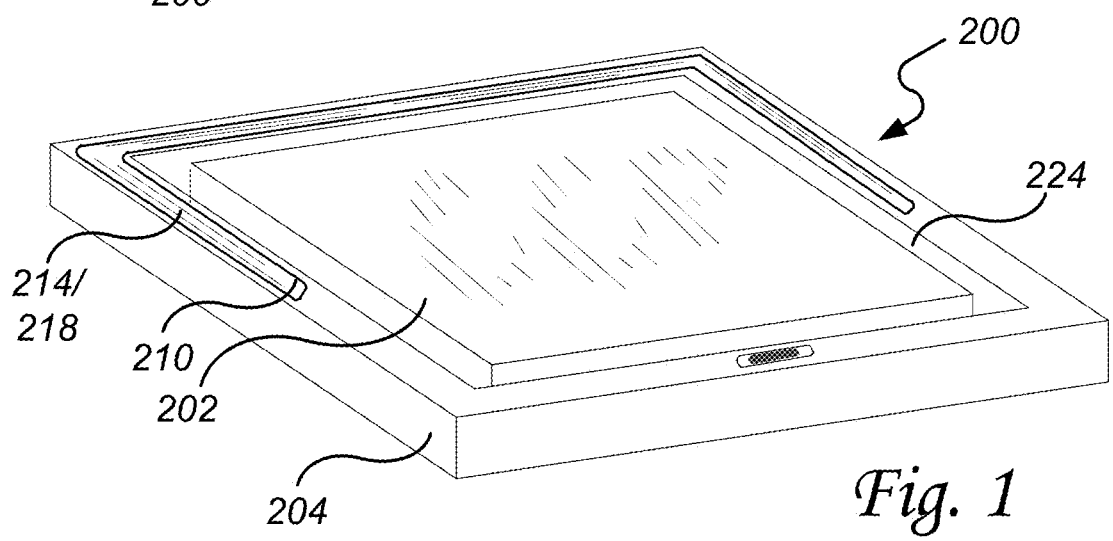
Fig. 1

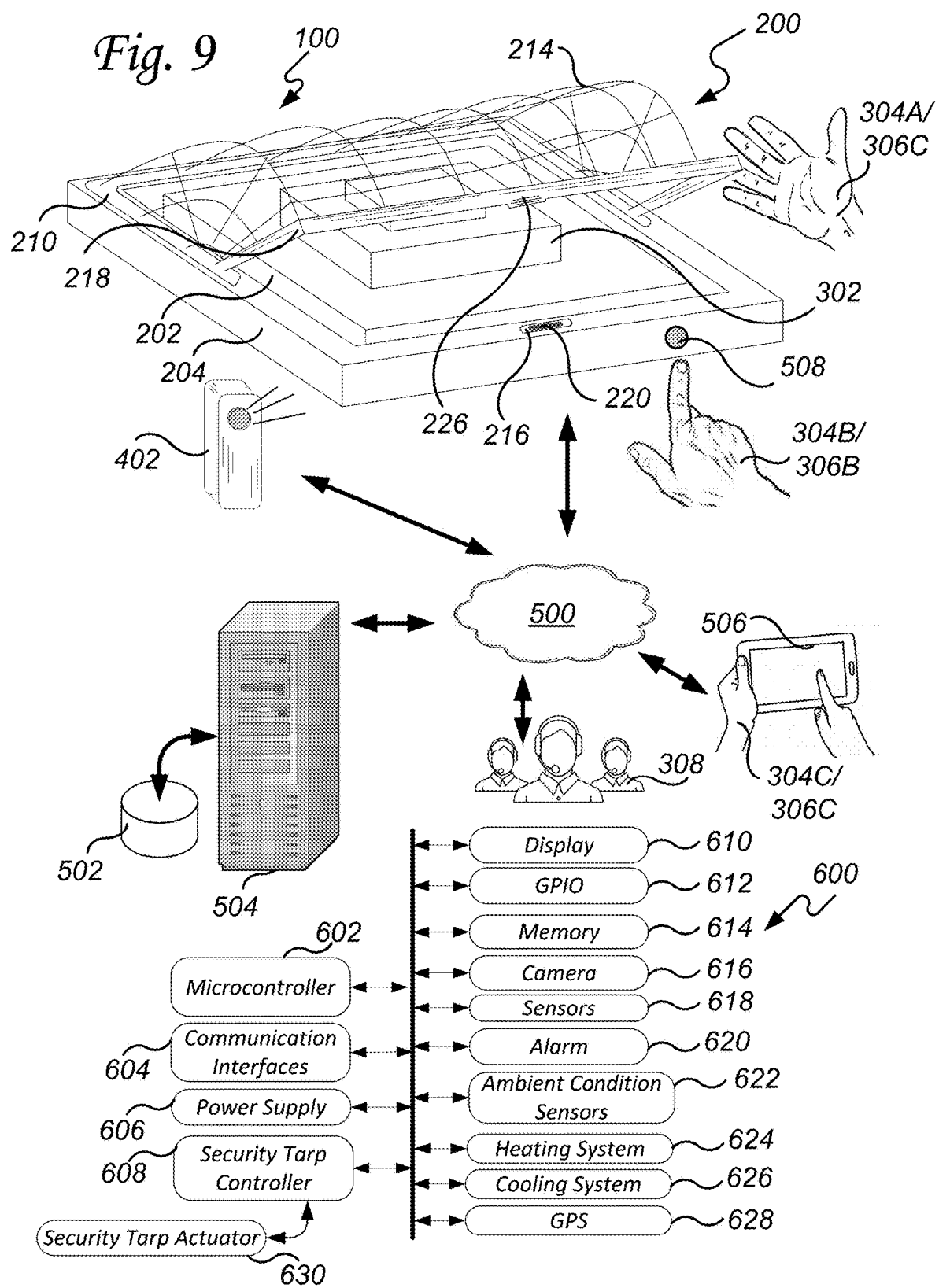

PACKAGE SECURING SYSTEM AND METHOD THAT PROTECTS DELIVERED PACKAGES FROM THEFT

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that is a continuation in part of a U.S. non-provisional application Ser. No. 16/406,398, inventor Cary C. Pappas, entitled "PACKAGE PROTECTING DOORMAT FRAME HAVING CONCEALED SECURITY TARP", filed May 8, 2019.

TECHNICAL FIELD OF THE INVENTION

This invention relates to a package securing system and method that protects delivered packages from theft by way of a package securing doormat frame having a concealed security tarp.

BACKGROUND OF THE INVENTION

Before our invention, with the growth of e-commerce, more and more people are purchasing products online and having them shipped to their destination address of choice. Often these destination addresses are their home where at the time of delivery a recipient might not be present. As such, when a recipient is not home often the delivery company will just leave the package unattended outside the recipient's house.

In a sign of our times, such unattended packages are appealing to thieves. Porch-pirating, as it is often called, is the practice of thieves who steal unattended packages. This problem has reached an epidemic level generating a multi-billion US dollar annual loss to businesses and consumers. 2017 package theft statistics suggested that 31% of us have experienced a package theft and that there are 17 reported incidents per 1,000 people in metro areas. Also, the average stolen package value is now $140 and the police make arrests in less than 10% of reported theft cases.

When the package is delivered and then pirated, the recipient may have little recourse. They can try to seek a replacement or refund from the company they bought the product from or they can try to seek a remedy from the delivery company. However absent some kind of fault and if records indicate the package was delivered, the companies involved will often just deny the recipient's claim. Once the claim is denied it can be a total loss for the recipient, no product in hand, and out the money spent on the product and shipping as well.

The present invention addresses this and other shortcomings by providing a way to secure delivered unattended packages from rascal porch-bandits. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a package securing system that protects delivered packages from theft by way of a package securing doormat frame having a concealed security tarp. The system comprising a frame that defines an interior region receives at least one of a mat. The frame having a recessed chamber along at least a portion of the perimeter of the frame. A securing rail is operationally related to the frame and repositionable. The securing rail, in an open position, is located proximate to the recessed chamber. A security tarp having at least a portion secured to the frame and at least a portion secured by the securing rail. The security tarp is stored in the recessed chamber. When at least one of a package is placed on the mat the package is secured by repositioning the securing rail from the open position to a closed position. The closed position extending the security tarp over the package, securing the package between the interior of the security tarp and the interior region of the frame.

A camera that is suitable for use in connection with detecting motion establishes an optical motion free zone around the package securing doormat frame. The camera is web-enabled and selectively data communicates at least one of a secure package notification to predefined recipients when motion is detected within the optical motion free zone, package delivery or package delivery exception occurs by a package delivery person, or in response to a space-available request. Certain of the secure package notification includes data or images from the camera.

Additional shortcomings of the prior art are overcome and additional advantages are provided through the provision of a method of protecting delivered packages from theft by way of a package securing doormat frame having a concealed security tarp. The method comprising the steps of placing a package securing doormat frame at a package receiving location. The package securing doormat frame comprising a frame, a securing rail, and a security tarp. The frame defines an interior region for receiving at least one of a mat. The frame having a recessed chamber along at least a portion of the perimeter of the frame. The securing rail is operationally related to the frame and repositionable. The securing rail, in an open position, is located proximate to the recessed chamber.

An optical motion free zone is established around the package securing doormat by way of a camera that is suitable for use in connection with detecting motion, web-enabled, and selectively data communicates at least one of a secure package notification to predefined recipients when motion is detected within the optical motion free zone, package delivery or package delivery exception occurs by the package delivery person, or in response to a space-available request. Certain of the secure package notification includes data or images from the camera.

At least one of a package is secured, when a package delivery person places the package on the mat, by repositioning the securing rail from the open position to a closed position which extends the security tarp over the package entrapping the package between the interior of the security tarp and the interior region of the frame. The security tarp having at least a portion secured to the frame and at least a portion secured by the securing rail.

Additional shortcomings of the prior art are overcome and additional advantages are provided through the provision of a method of protecting packages from theft by way of a package securing doormat frame having a concealed security tarp. The method comprising the steps of placing a package securing doormat frame at a package receiving location The package securing doormat frame comprising a frame, a securing rail, a security tarp, a camera, and a web-enabled control system. The frame defines an interior region for receiving at least one of a mat. The frame having a recessed chamber along at least a portion of the perimeter of the frame. The securing rail is operationally related to the frame and repositionable. The securing rail, in an open position, is located proximate to the recessed chamber.

An optical motion free zone is established around the package securing doormat frame, by way of the camera that is suitable for use in connection with detecting motion and operational related to the web-enabled control system. At least one of a package is secured, when a package delivery person places the package on the mat, by repositioning the securing rail from the open position to a closed position which extends the security tarp over the package entrapping the package between the interior of the security tarp and the interior region of the frame. The security tarp having at least a portion secured to the frame and at least a portion secured by the securing rail.

At least one of a secure package notification is sent to predefined recipients, by way of the web-enabled control system, when motion is detected proximate to the optical motion free zone, package delivery, or package delivery exception occurs by the package delivery person, or in response to a space-available request. Certain of the secure package notification includes data or images from the camera.

Systems, manufacturing, and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates one example of a house or business equipped with a package securing doormat frame;

FIG. 9 illustrates one example of a package securing doormat frame that is web-enabled;

Figure 2:
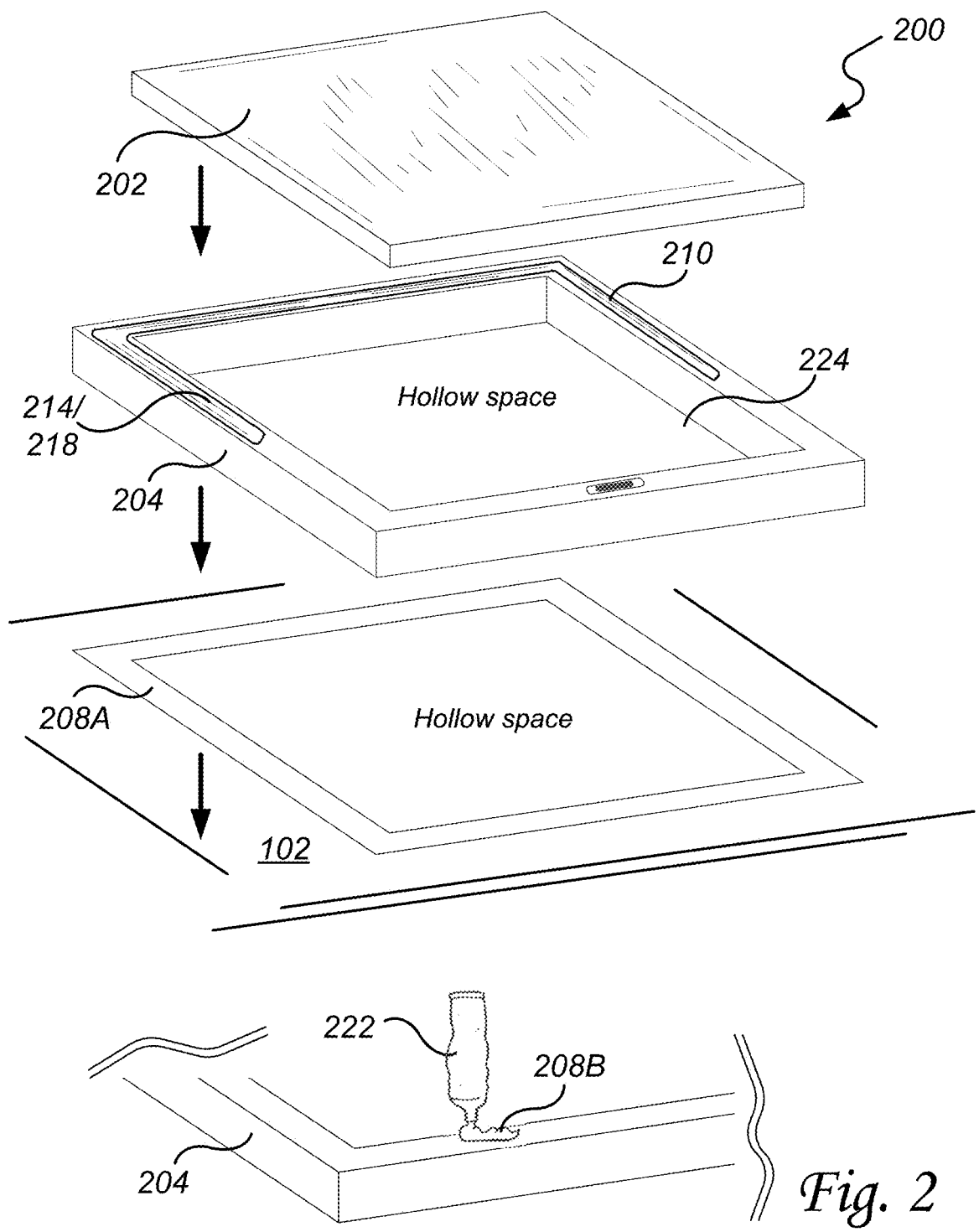
FIG. 2 illustrates one example of a package securing doormat frame installation.

The detailed description explains the preferred embodiments of the invention, together with advantages and features, by way of example with reference to the drawings.

DETAILED DESCRIPTION OF THE INVENTION

Turning now to the drawings in greater detail, it will be seen that in FIG. 1 there is illustrated one example of a house or business 100 equipped with a package securing doormat frame 200. Consumers take pride in how their house looks from the street. In fact, Realtors call this curb appeal. An advantage in the present invention is that while providing delivered unattended package security, the front of the consumer's home or business is not encumbered by unsightly cages or bulky security drop boxes. Rather, the front doormat can be placed in a package securing doormat frame that while bringing a touch of elegance to the front entrance of the home or business also doubles to secure delivered unattended packages.

In this regard, the package securing doormat frame comprises a frame 204 which forms an interior region 224 for receiving at least one of a mat 202, the frame 204 having a recessed chamber 210 along at least a portion of the frame perimeter. A securing rail 218 is operationally related to the frame 204 and repositionable, the securing rail 218 in an open position is located proximate to the recessed chamber 210. A security tarp 214 has at least a portion secured to the frame 204 and at least a portion secured by the security rail 218. The security tarp 214 is stored in the recessed chamber 210. Illustrated better in at least FIG. 6, when at least one of a package 302 is placed on the mat 202 the package 302 is secured by repositioning the security rail 218 from the open position to a closed position, the closed position extending the security tarp 214 over the package 302 securing the package between the interior of the security tarp 214 and the interior region 224 of the frame.

Referring to FIG. 2 there is illustrated one example of a package securing doormat frame 200 installation. In an exemplary embodiment, while not excluding plastics, preferably the frame 204 is made of metal such as steel, aluminum, or other metal. A portion of the frame can be u-channel facing upwards to create the recessed chamber 210 and a portion of the frame can be a square tube. The u-channel and square tube can then be combined and welded to form the frame 204.

In another exemplary embodiment, square tubing can be used for frame 204 and the recessed channel 210 can be formed by cutting a portion of the top surface of the frame 204. In another exemplary embodiment, the frame can be formed by whatever shape material is desired and a recessed chamber can be welded or otherwise bonded onto the frame.

In a plurality of other exemplary embodiments the frame can be formed by different methods, plastics, metals, and assembly techniques, as may be required and/or desired in a particular embodiment.

In some neighborhoods or with some consumer 306 preferences it may be acceptable or desirable to simply place the frame 204 on the ground 102 and position the mat 202 in the interior region 224 of the frame 204 to complete the installation.

In other neighborhoods or with other consumers 306 preferences it might be desirable to place an adhesive 208A in strip or cutout sheet form around the perimeter of the frame 204 and adhere the frame 204 to the ground 101. Such adhesive 208A can be a double sticky sided foam tape, COMMAND STRIPS, or other types and kinds of adhesive as may be required and/or desired in a particular embodiment.

In another exemplary embodiment, adhesive 208B can be dispensed from a tube 222 or caulk gun. In this regard, a thick bead of silicone waterproof caulk, LIQUID NAILS adhesive, elastomer caulk such as used with flashing and roof applications, and other type and kinds or caulks, adhesives, and sealants can be used as may be required and desired in a particular embodiment.

Such type of adhesive material and methods of applying can be selected based on the desired strength it would take to remove the frame 204 from the ground 102 and/or the potential damage it may cause upon removal to the ground 102 surfaces like brick, stone, concrete, or other types of surface. In this regard, a thick bead of silicon-based caulk might be sufficient to secure the frame 204 to the ground 102 to thwart a porch-bandit, as well as prevent rainwater from running under the frame 204 but still enable the consumer 306 to, with reasonable effort, remove the frame 204 from the ground 102 with little to no damage to the ground 102 surface material. Large COMMAND STRIP type adhesives also offer superior bonding and strength but can be removed by the consumer with reasonable effort. Stronger adhesives like LIQUID NAILS and other similar holds stronger but may impact how easily the frame 204 can later be removed from the ground 102 by the consumer 306.

Once the frame 204 is positioned and/or adhered to the ground 102 the mat 202 can be placed in the interior region 224. Also illustrated is the security rail 218 located proximate to the recessed chamber 210 and the security tarp 214 concealed or otherwise stored in the receded chamber 210.

Figure 3A:
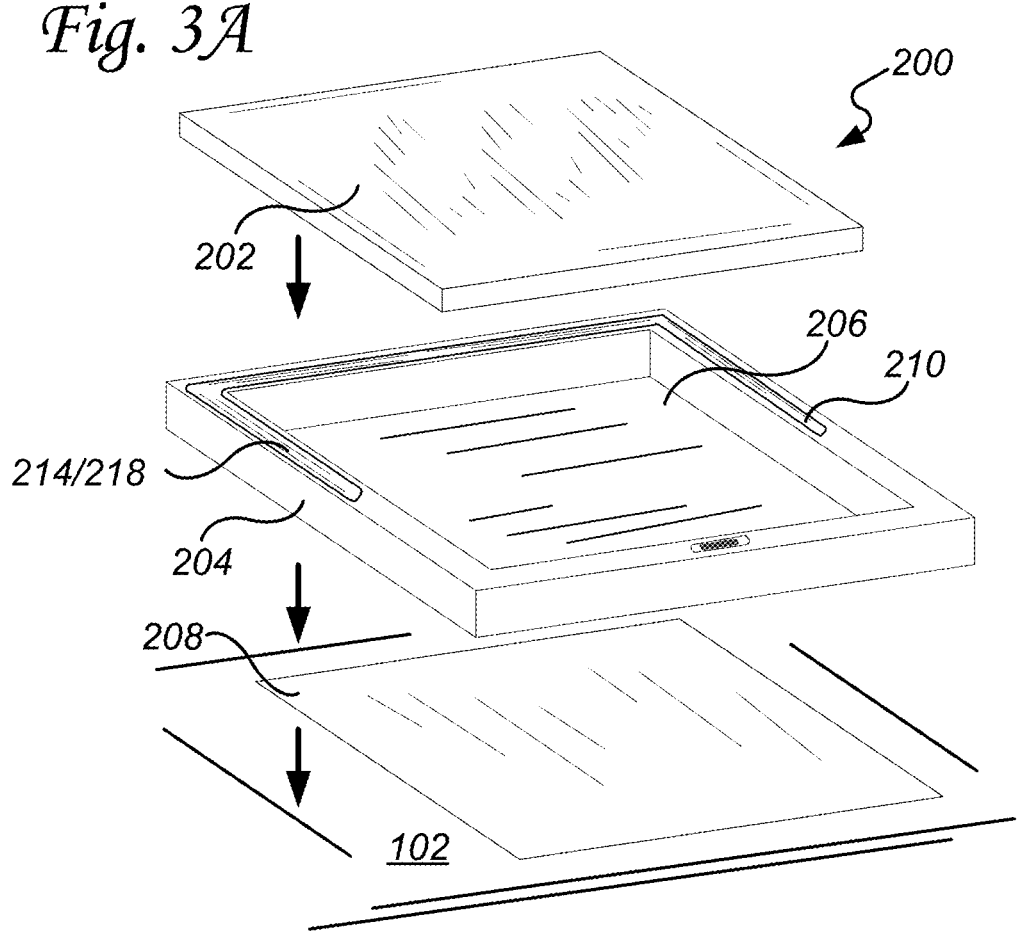
FIG. 3A illustrates one example of a package securing doormat frame with a solid and optionally adjustable back panel installation.

Referring to FIG. 3A there is illustrated one example of a package securing doormat frame with a solid and optionally adjustable back panel 206 installations. Similar in installation to FIG. 2, in this exemplary embodiment, a back panel 206 is fastened to the bottom or interior sides of the frame 204. The back panel 206 can be fabricated from preferably metal however other materials can be selected as may be required and/or desired in a particular embodiment. One of the purposes of the back panel is to create a larger surface area for the adhesive 208. In this regard, the larger surface area enables the use of more adhesive sheeting, foams, COMMAND STRIP, tube 222 based caulks, sealants, or adhesive. The additional adhesive engenders a stronger bond to the ground 102 surfaces.

An advantage, in an exemplary embodiment, and another purpose of the back panel 206 is that the back panel 206 can adjust the distance between the top edge of the frame 204 and the top surface of the back panel 206. In this regard, if the mat 202 is thin in comparison to the thickness of the frame 204 the mat 202 can nest too deep into the frame 204 interior making a user of the mat 202 feel like they are stepping down into the frame 204 to use the mat 202. Also, the mat 202 while nested too deep in the frame cannot be easily seen as guests approach the house or business 100. Furthermore, a mat 202 nested too deep in the frame 204 can create a tripping hazard as users of the mat 202 are having to step down into and out of the frame 204 to enter or leave the house or business 100. To remedy this, the back panel 206 sets the depth distance effectively raising the mat 202 so that the top of the mat 202 is aligned with the top of the frame 204. In operation, the back panel 206 can be manufactured so that a consumer 306 can adjust the depth of the back panel to accommodate the thickness of their mat 202, effectively customizing the alignment of the top of their mat 202 with the top of the frame 204.

Another advantage in the present invention of the back panel 206 is that it seals the bottom of the frame 204 from the ground and ingress on debris, surface water, ants, and bugs. This is important if the consumer 306 is planning on receiving packages of food or other packages where it is preferable they do not get dirty, wet, or infested ants, and bugs.

Once the frame 204 is positioned and/or adhered to the ground 102 the mat 202 can be placed in the interior region 224 of the frame 204. Also illustrated is security rail 218 located proximate to the recessed chamber 210 and the security tarp 214 concealed within the recessed chamber 210.

Figure 3B:
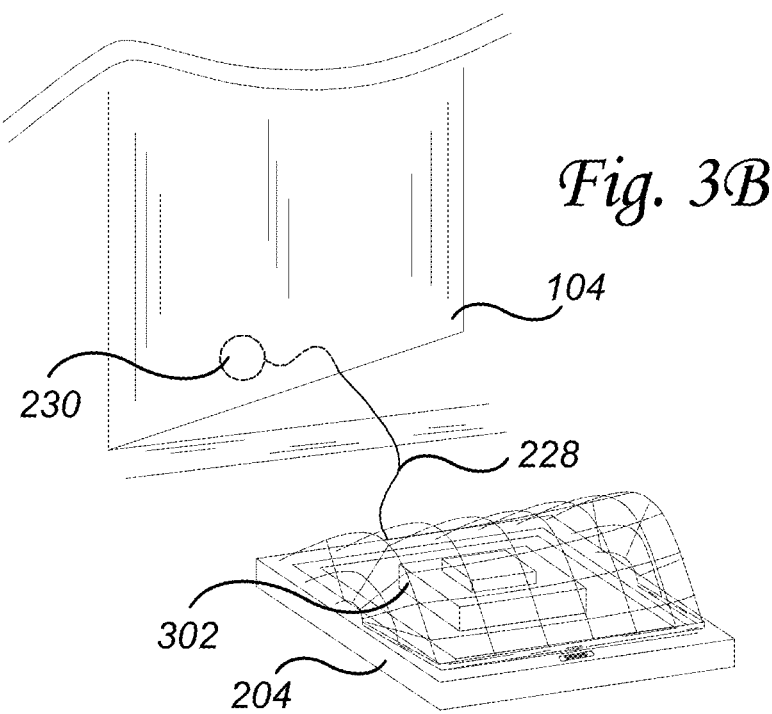
FIG. 3B illustrates one example of a package securing doormat frame with a tether.

Referring to FIG. 3B, there is illustrated one example of a package securing doormat frame with a tether 228. In an exemplary embodiment, a tether 228 has a first end attached to the frame 204 and a second end 230 that is securable behind a closed-door 104 or window. In operation, the tether 228 effectuates the ability to secure the frame 204 which is securing and the package contents 302 secured by the frame 204 from being removed or otherwise stolen from the porch by porch bandits. To secure the frame 204 and package contents 302 to the porch the tether 228 can be pulled under an open door 104 or window and the door 104 or window closed. A knot, ball, or other form, shape, or object 230 that make up the second end portion 230 prevents the second end 230 from being extracted or otherwise pulled from under a closed-door 104 or window thus securing the frame 204 and the secured package contents from being removed from the porch.

When desired, the frame 204 can be removed from the porch by sliding the tether 228 from under an open door 104 or window.

Figure 4:
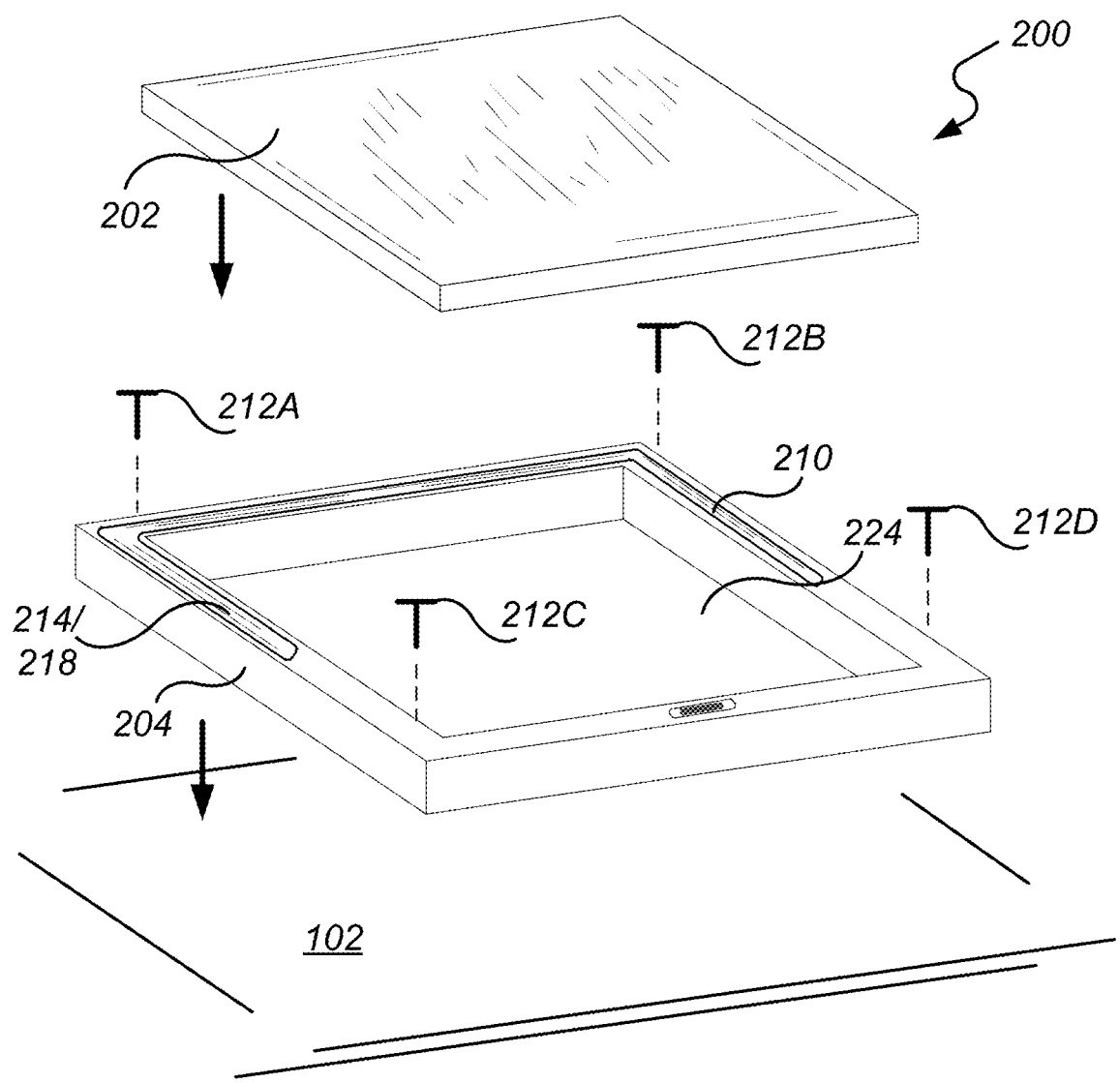
FIG. 4 illustrates one example of a package securing doormat frame installation utilizing anchor bolts.

Referring to FIG. 4 there is illustrated one example of a package securing doormat frame 204 installation utilizing anchor bolts 212A-212D. In another exemplary embodiment, if the installation methods and techniques of FIG. 2 and FIG. 3A, with the use of caulks or adhesives are inadequate to secure the frame 204 to the ground 102 then anchor bolts 212A-212D can fasten the frame 204 to the ground 102.

Once the frame 204 is positioned, fastened, and/or adhered to the ground 102 the mat 202 can be placed in the interior region 224 of the frame 204. Also illustrated is the security rail 218 located proximate to the recessed chamber and the security tarp 214 concealed or otherwise stored within the recessed chamber 210.

Figure 5:
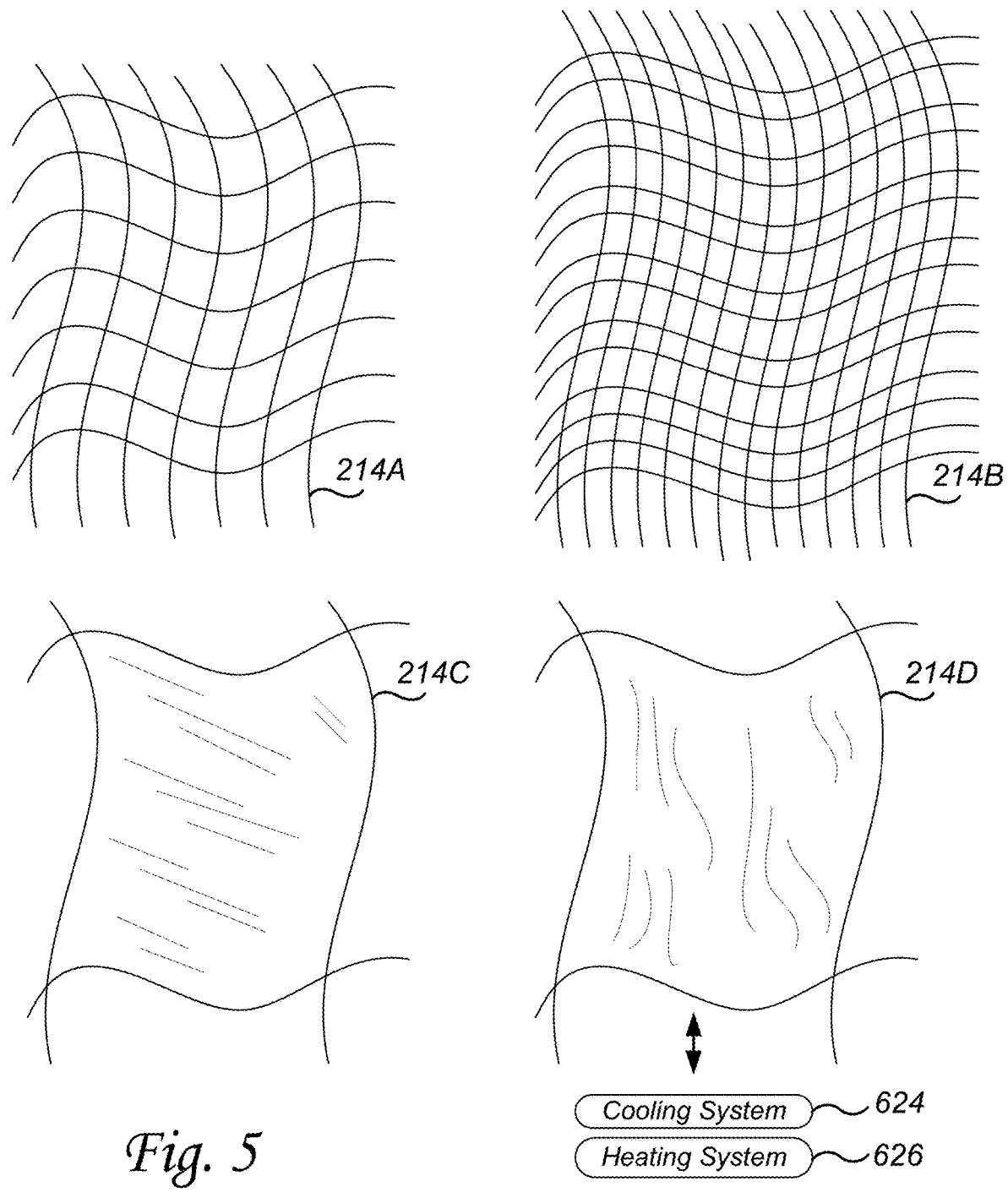
FIG. 5 illustrates examples of a security tarp.

Referring to FIG. 5 there is illustrated examples of a security tarp 214. In an exemplary embodiment, a security tarp 214 is cut and tear resistant and well suited to prevent a porch-bandit from removing a package from the mat with the package securing doormat frame 200 is in the closed position where the security tarp 214 is extended over the package 302 thus securing the package 302 between the interior of the security tarp and the interior region 224 of the frame 204. To this end, there are several materials and combinations of materials that are well suited to be used as a security tarp 214. Such a list is provided as an example and not as a limitation.

Such security tarp 214 material is preferably cut, tear, and break resistant netting 214A. The spacing of the net fiber web can be wide as in 214A or closer together like in 214B. The fibers can be nylon, KEVLAR rope, metal wire, wire rope, rope, chain, or other material as may be required and/or desired in a particular embodiment.

Such fibers can from an open net where the package 302 can be seen with the net extended over the package 302 or can be combined into a sheet 214C such as plastic, KEVLAR sheeting, canvas, or other material which blocks the package 302 from sight. In addition, when such a reinforced sheet covers the packages 302 it can secure as well as be weather resistant to snow and rain when such is the desired feature.

Additionally, such sheet can be a thermal blanket 214D. In this regard, the package securing doormat frame 200 can incorporate a heating 626 or cooling 624 system. Such a system is better illustrated in at least FIG. 9. Such a thermal blanket 214D can be reinforced with other sheets 214C as well as netting 214A or 214B for security. The thermal blanket 214D is desirable when the package securing doormat frame 200 is used to receive hot food or prevent freezing in cold weather and/or packages that require refrigeration such as medical supplies and/or prescriptions or prevent packages from overheating in hot weather.

The thermal blanket not only aids in temperature control of the secured interior region 224 between the interior of the security tarp 214 and the mat 202 but can also be useful to abate heated direct sunlight. In this regard, when the package securing doormat frame 200 is a place where delivered packages are in direct sunlight overheating of the package contents could occur. In this situation, the thermal blanket security tarp extended across the packages to help shield the packages from a portion of the sun-induced heat.

Figure 6:
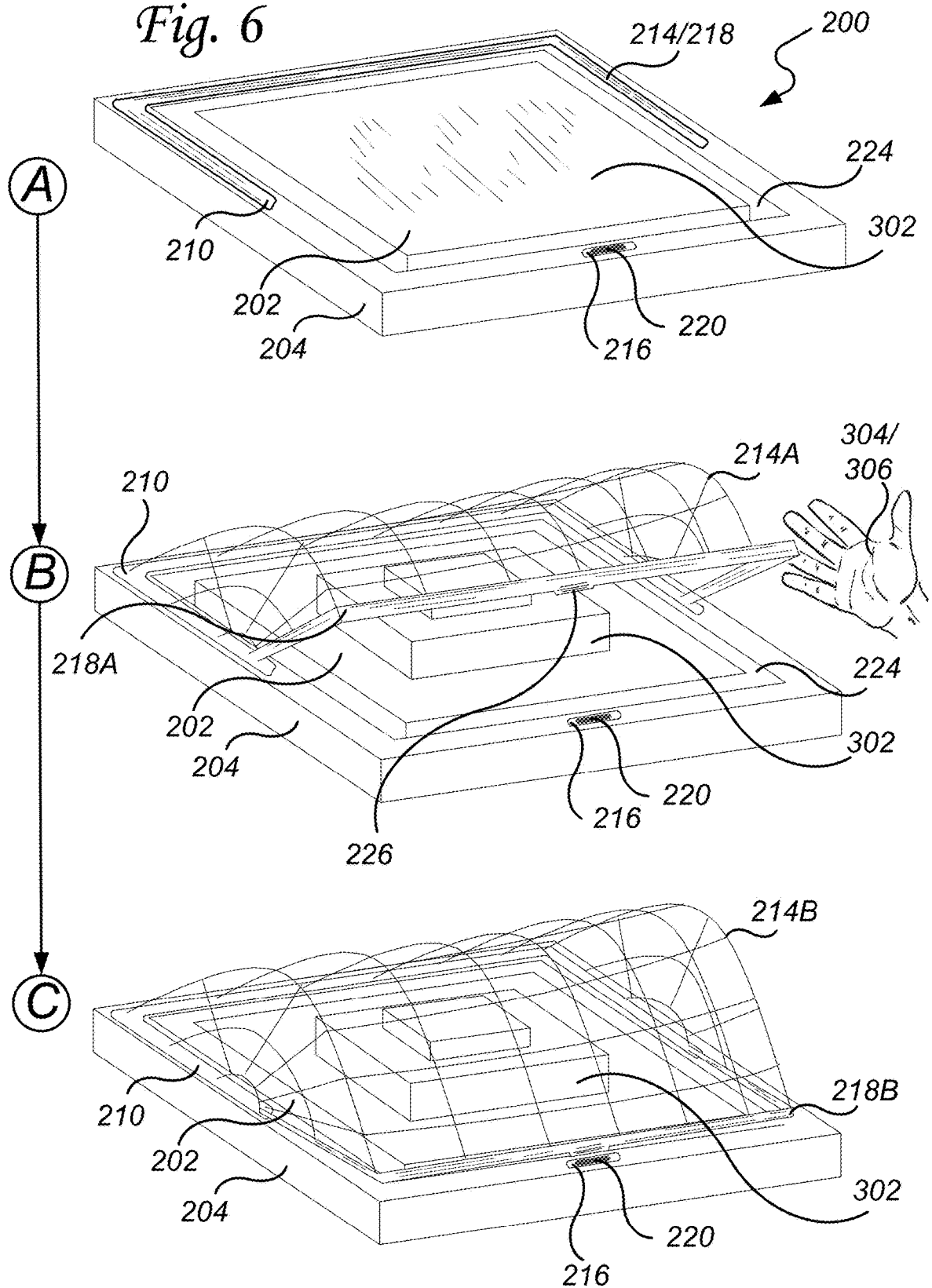
FIG. 6 illustrates one example of a package securing doormat frame transitioning from the open position to the closed position.

Referring to FIG. 6 there is illustrated one example of a package securing doormat frame 200 transitioning from the open position to the closed position. Three positions are illustrated. Position 'A' is the open position, position 'B' is the transition position, and position 'C' is the closed position.

Starting with the open position 'A', in an exemplary embodiment a package securing doormat frame 200 is placed at a package receiving location 100 such as a home or business. The package securing doormat frame 200 comprises a frame 204, a security rail 218, and a security tarp 214.

The frame 204 forms an interior region 224 within the perimeter of the frame 204 for receiving at least one of a mat 202. The frame 204 has a recessed chamber 210 along at least a portion of the frame 204 perimeter. The securing rail 218 is operationally related with the frame 204 and repositionable. The security rail 218 is located proximate to the recessed chamber 210 and the security tarp 214 is concealed within the recessed chamber 210. The securing rail 218 is in an open position.

In an exemplary embodiment, the securing rail 218 can be shaped and fitted to seal or otherwise cover the recessed chamber 210 from ingress of debris and water when the security rail 218 is in the open position.

In position 'B', a package delivery person 304 has placed at least one package 302 on mat 202. The security rail 218 can then be transitioned by hand 304 or if a web-enabled control system is in use automatically transitioned from the open position towards the closed position causing the security tarp 214 which is attached to the security rail 218 to emerge from storage in the recessed chamber and extend across the package 302.

In position 'C' the package is secured by repositioning the security rail 218 from the open position to a closed position which extended the security tarp 214 over the package 302 entrapping the package 302 between the interior of the security tarp 214 and the interior region 224 of the frame 203. The security tarp 214 has at least a portion secured to the frame 204 and at least a portion secured by the security rail 218.

In an exemplary embodiment, the security rail 218 comprises a security edge 226 and the frame 204 further comprising a security latch 216. The security edge 226 and security latch 216 interlock holding the security rail 218 in the closed position.

A security rail locking mechanism 220 is integrated into the frame 204, the security rail locking mechanism 220 effectuates the ability to lock and unlock the security rail 218 from the closed position.

In an exemplary embodiment, in the closed position the security rail 218 is latched or otherwise locked into position by way of the security rail locking mechanism 220. Once latched it will require a key, code, electronic signal data communicated to a web-enabled of a package securing doormat frame 200, or similar to unlatch or otherwise unlock the security rail 218 so that the package 302 can be retrieved.

In this regard, upon arriving to retrieve the package 302, the consumer 306 unlocks the security rail 218 manually and by hand return the security rail 218 and security tarp 214 to the open position 'A', re-storing the security tarp 214 in the recessed chamber 210.

If a web-controlled control system 600 is in use such returning to position 'A' can be automatic and/or effectuated by way of authorization being data communicated to the package securing doormat frame 200 with instructions to return to the open position. A security tarp actuator 630, better illustrated in at least FIG. 9, can be used to transition the security rail 218 between the open position and the closed position.

The term "web-enabled" or "web-enabled control system" or "web-enabled control system 600" in the present invention is intended to mean an Internet-of-things device. In this regard, a device that is capable of connecting a physical device such as the package securing doormat frame 200 to the digital world. State differently, web-enabling is equipping a device with the necessary electronics to be monitored, controlled, and data communicate locally and remotely with other data communicating devices. Such other data communicating devices can be smart-phones, tablets, laptops, other web-enabled devices, servers, cameras, and similar devices. For purposes of disclosure and with reference to at least FIG. 9, these other data communicating devices can be referred to as a data device 506. The web-enabled camera 402 can be referred to as web-enabled and a data device.

In addition, such data devices 506 can data communicate with remote data processing resources 504 and utilize data storage resources 502. Such data processing resources can be a server or other types and kinds of data processing resources. Furthermore, data devices 506, remote data processing resources 504, data storage resources 502, and other types and kinds of data communicating devices can data communicate over a global network 500. The global network 500 can be the Internet.

Figure 7:
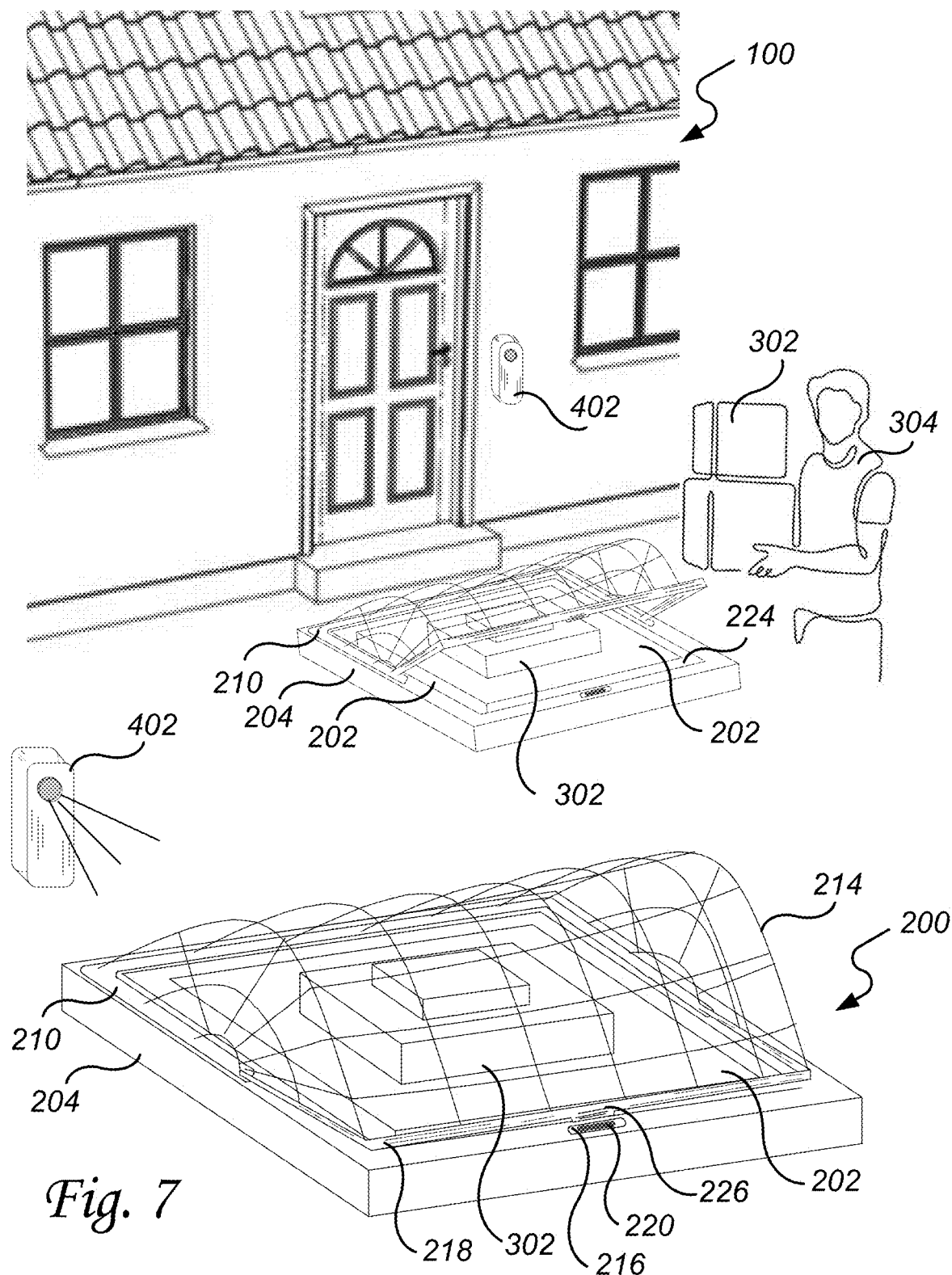
FIG. 7 illustrates one example of a package delivery person placing packages on a mat, the packages are then secured by a package securing doormat frame.

Referring to FIG. 7 there is illustrated one example of a package delivery person 304 placing packages 302 on a mat 202, the packages 302 are then secured by a package securing doormat frame 200. In an exemplary embodiment, the package securing doormat frame 200 is placed at the front door of a house or business 100 or other convenient package receiving location.

When a package delivery person 304 arrives at the location 100 with packages 302 they can quickly place on the mat 202 and transition the security rail 218 from the open position to the closed position. In the closed position, the security rail 218 is latched or otherwise locked into position by way of security rail locking mechanism 220. Once latched it will require a key, code, electronic signal data communicated to a web-enabled package securing doormat frame 200, or similar to unlatch or otherwise unlock the security rail 218 so that the package 302 can be retrieved.

The security rail 218 comprises a security edge 226 and the frame 204 further comprising a security latch 216. The security edge 226 and security latch 216 interlocks holding the security rail 218 in the closed position.

In an exemplary embodiment, the security rail locking mechanism 220 is integrated into the frame 204, the security rail 218 release locking mechanism 220 effectuates the ability to lock and unlock the security rail 218 from the closed position.

In another exemplary embodiment, a web-enabled camera 402 can be positioned to observe the package securing doormat frame 200. In this regard, by way of a camera 402 an optical motion free zone around the package securing doormat frame 200 can be established. Such an optical free zone occurs when a camera compares success images of the same view to determine if a change has occurred and if so has a preset motion threshold been reached. Such a camera 402 can be a RING device, surveillance camera, or other cameras. Camera 402 can also be combined with PIR sensors to detect motion.

When motion is detected, by way of the camera 402, within the motion free zone, an alarm condition is initiated. Such alarm conditions can include recording video, by way of the camera 402, sending a secure package notification to a predetermined recipient, activating an alarm bell or voice, or initiating other alarms as may be required and/or desired in a particular embodiment.

Figure 8A:
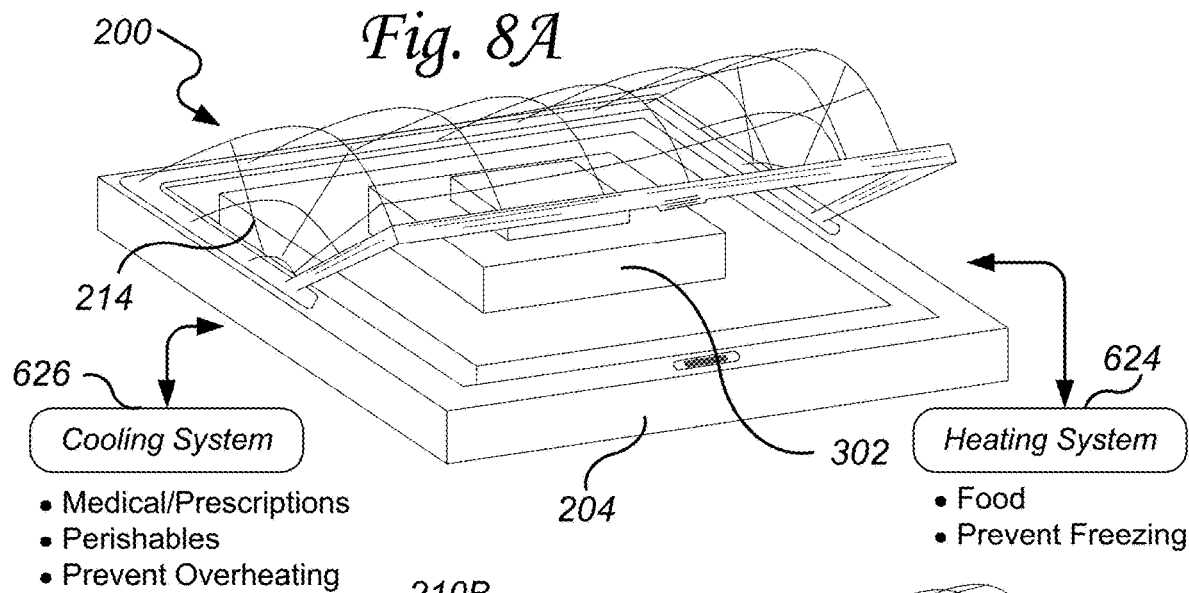
FIGS. 8A, 8B, and 8C illustrate exemplary embodiments of a package securing doormat frame.
Figure 8B:
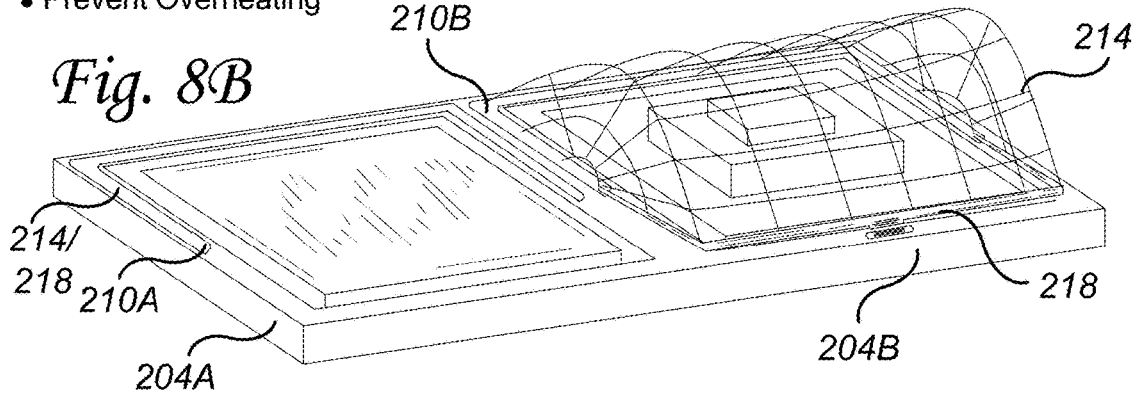
Figure 8C:
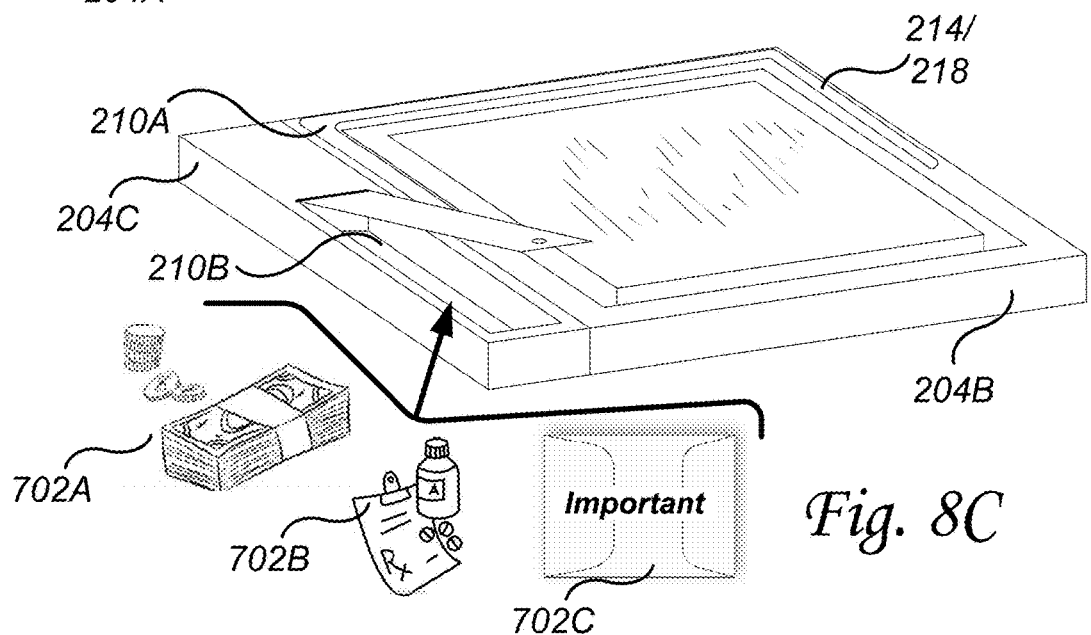

Referring to FIGS. 8A, 8B, and 8C there is illustrated exemplary embodiments of a package securing doormat frame 200. With reference to FIG. 8A, there is illustrated an exemplary embodiment of a package securing doormat frame 200 that has been equipped with a heating system 624 and/or a cooling system 626. In this regard, in combination with a security tarp 214 packages such as food, medical prescriptions, perishables, and other packages 302 types that benefit from being kept warm or cold can be accommodated. The heating system 624 and/or the cooling system 626 can be integrated into the frame 204 to keep the package 302 warm or cold, as may be required and/or desired in a particular embodiment.

An advantage in the present invention is that the heating 624 and cooling 626 systems can be used in combination with a thermal blanket material security tarp 214 to enable warming of the package 302 to prevent freezing in cold weather and/or cooling of the package 302 to prevent overheating in hot weather.

With reference to FIG. 8B, there is illustrated an exemplary embodiment of interconnecting more than one package securing doormat frame 204A and 204B together. In this regard, each can operate independently to accommodate additional packages. An advantage can be that if more than one package delivery person delivers packages each delivery can be secured without having to open a previously secured a package securing doormat frame. This also offers an attractive option for homes or business 100 that have double doors and would ideally have a mat associated with each door.

In an alternative exemplary embodiment, a single security tarp 214 can be configured to cover more than one frame 204A and 204B. In this regard, more packages 302 and/or larger size packages 302 can be accommodated with a single security tarp 214 spanning multiple co-joined interior regions 224. In a plurality of exemplary embodiments, a combination of single security tarp 214 secures single frame 204 and a mix of single security tarp 214 secures multiple interior regions 224 of frames 204 interlocked together can be configured to meet package delivery person 304 and/or consumer 306 needs, as may be required and/or desired in a particular embodiment.

Referring to FIG. 8C there is illustrated an exemplary embodiment that interconnects a package securing doormat frame 204B with one or more of package securing doormat frame lockbox 204C. The lockbox 204C made of metal or other desirable materials is designed to receive valuables such as money 702A, medical prescriptions 702B, important papers 702C, and other types and kinds of packages that are small and/or require lockbox types security. The lockbox 204C can be opened and closed by key, code, electronic signal data communicated to a web-enabled package securing doormat frame 200, or other methods as may be required and/or desired in a particular embodiment.

An advantage in the present invention is that the exemplary embodiments can be mixed and matched to configure the package securing doormat frames, lockboxes, and other capabilities as required and/or desired in a particular embodiment. As an example and not a limitation, three package securing doormat frames can be interlocked together or a lockbox can be fashioned between two package securing doormat frames. In other embodiments two package securing doormat frames can be interlocked together and one of the package securing doormat frames can be configured to heat and the other equipped to cool. In a plurality of exemplary embodiments, the flexibility of the present invention to mix package securing doormat frames, lockboxes, and other functional units allows the consumer 306 to configure a fit-for-purpose package securing system to meet their individual needs.

Referring to FIG. 9 there is illustrated one example of a package securing doormat frame 200 that is web-enabled.

The term "web-enabled" or "web-enabled control system" or "web-enabled control system 600" in the present invention is intended to mean an Internet-of-things device. In this regard, a device that is capable of connecting a physical device such as the package securing doormat frame 200 to the digital world. State differently, web-enabling is equipping a device with the necessary electronics to be monitored, controlled, and data communicate locally and remotely with other data communicating devices. Such other data communicating devices can be smart-phones, tablets, laptops, other web-enabled devices, servers, and similar devices.

In addition, such data devices 506 can data communicate with remote data processing resources 504 and utilize data storage resources 502. Such data processing resources can be a server or other types and kinds of data processing resources. Furthermore, data devices 506, remote data processing resources 504, data storage resources 502, and other types and kinds of data communicating devices can data communicate over a global network 500. The global network 500 can be the Internet.

In an exemplary embodiment, the package securing doormat frame 200 can be equipped with a web-enabled control system 600. Such a web-enabled control system can comprise a microcontroller 602 which is operationally related to a plurality of communication interfaces 604, a power supply 606, a security tarp controller 608, a display 610, general-purpose inputs and outputs (GPIO) interface 612, a memory 614, a camera interface 616, a plurality of sensors 618, an alarm 620, ambient condition sensors 622, a heating system 624, a cooling system 626, and global position system device 628. The security tarp controller 608 can be interconnected with a security tarp actuator 630.

The microcontroller 602 can be an INTEL, ZILOG, MICROCHIP, AMD, ARM, and/or other types or kinds of microcontrollers.

The communication interfaces 604 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

The power supply 606 can be AC, DC, battery, solar, and/or other types and kinds of power supplies.

The security tarp controller 608 can be a relay, MOSFET or other types and kinds of controlling devices. The Security tarp actuator 630 can be a motor, solenoid, and/or other types and kinds of actuators.

The display 610 can be an LCD, OLED, LED, and/or other types and kinds of displays.

The GPIO 612 can be TTL, CMOS, transistors, buffers, relays, pushbutton, switch, and/or other types and of types and kinds of GPIO circuits.

The memory 614 can be combinations of RAM, ROM, flash, hard drives, solid-state drives, USB flash drives, and/or other types and kinds of memory.

The camera interface 616 can be integrated into the frame 204 or can be remote such as illustrated by camera 402 so that the camera view is of the package securing doormat frame 200 and surrounding area. Also, several cameras can be utilized to create a network of camera views that can monitor a broader area. Such multiple camera applications can include some that are integrated into the frame 204 and some that are remote. Web-enabled camera 402 can interface and data communicate as one of the camera interface 616.

The sensors 618 can be PIR motion sensors, infrared, thermal, Doppler radar, ultrasonic, capacitance, touch-type, optical, Hall effect, switch, fingerprint, and other types of biometric sensors, and/or other types and kinds of sensors.

The alarm 620 can be noise lights, relays, siren, horn, piezo buzzer, speaker, voice annunciations, and/or other types and kinds of alarms.

The ambient condition sensors 622 can be temperature, moisture, humidity, sunlight, time, date, and/or other types and kinds of sensors.

The heating system 624 can be resistive heat with fan circulation, thermoelectric, and/or other types and kind of heating systems.

The cooling system 626 can be a Peltier thermoelectric system and/or other types and kinds of cooling systems.

The global position system (GPS) device 628 can be used to determine the geographic location of the package securing doormat frame.

In operation, in an exemplary embodiment, the package securing doormat frame 200 can be equipped with a web-enabled control system 600 so that the package securing doormat frame 200 can be remotely monitored and controlled. Such remote monitoring and control can be effectuated by the package delivery person 304, the consumer 306, a remote service provider 308, and/or others as may be required and/or desired in a particular embodiment. Such remote service provider 308 can be PorchBanditProtection.com, an alarm monitoring company, a package delivery company, or other types and kinds of remote service providers.

In addition, such remote monitoring control can be by way of digit device 506 or remote data processing resource 504. Furthermore, package securing doormat frame 200 can be operated manually, by hand, illustrated as the package delivery person 304A and the consumer 306A and/or through a control panel 508, when so configured, illustrated as the package delivery person 304B or the consumer 306B.

In an exemplary embodiment, the security rail 218 comprises a security edge 226 and the frame 204 further comprising a security latch 216. The security edge 226 and security latch 216 interlocks holding the security rail 218 in the closed position.

A security rail locking mechanism 220 is integrated into the frame 204, the security rail locking mechanism 220 effectuates the ability to lock and unlock the security rail 218 from the closed position. Such security rail locking mechanism 220 in a web-enabled control system 600 applications can be actuated locally or remotely controlled.

In the closed position, the security rail 218 is latched or otherwise locked into position by way of security rail locking mechanism 220. Once latched it will require a key, code, electronic signal data communicated to a web-enabled of a package securing doormat frame 200, or similar to unlatch the security rail 218 so that the package 302 can be retrieved.

Figure 10:
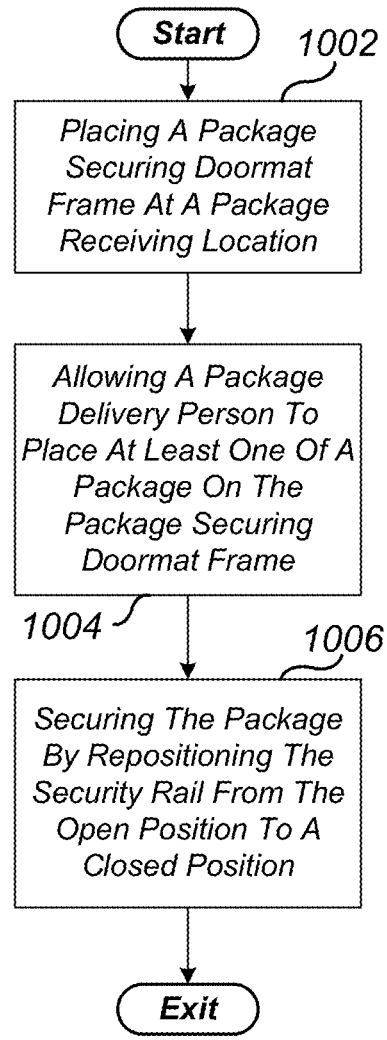
FIGS. 10 and 11 illustrate examples of a method of protecting packages by way of a package securing doormat frame having a concealed security tarp.

Referring to FIG. 10 there is illustrated one example of a method of protecting packages by way of a package securing doormat frame having a concealed security tarp. In an exemplary embodiment, the method begins in block 1002.

In block 1002 a package securing doormat frame 200 is placed at a package receiving location such as a house or business 100. The package securing doormat frame 200 comprises a frame 204, a security rail 218, and a security tarp 214. The frame 204 forms an interior region 224 for receiving at least one of a mat 202. The frame 204 has a recessed chamber 210 along at least a portion of the frame 204 perimeter. The securing rail 218 is operationally related to frame 204 and repositionable. The securing rail 218 in an open position is located proximate to the recessed chamber 210, such as illustrated in at least position 'A' of FIG. 6. The method moves to block 1004.

In block 1004, a package delivery person 304 is allowed to place at least one of a package 302 on the mat 202. The method moves to block 1006.

In block 1006, the package 302 is secured by repositioning the security rail 218 from the open position to a closed position which extends the security tarp 214 over the package 302 entrapping the package 302 between the interior of the security tarp 214 and the interior region 224 of the frame 204. The closed position is illustrated in at least position 'C' of FIG. 6. The security tarp 214 has at least a portion secured to the frame 204 and at least a portion secured by the security rail 218. The method is then exited.

Figure 11:
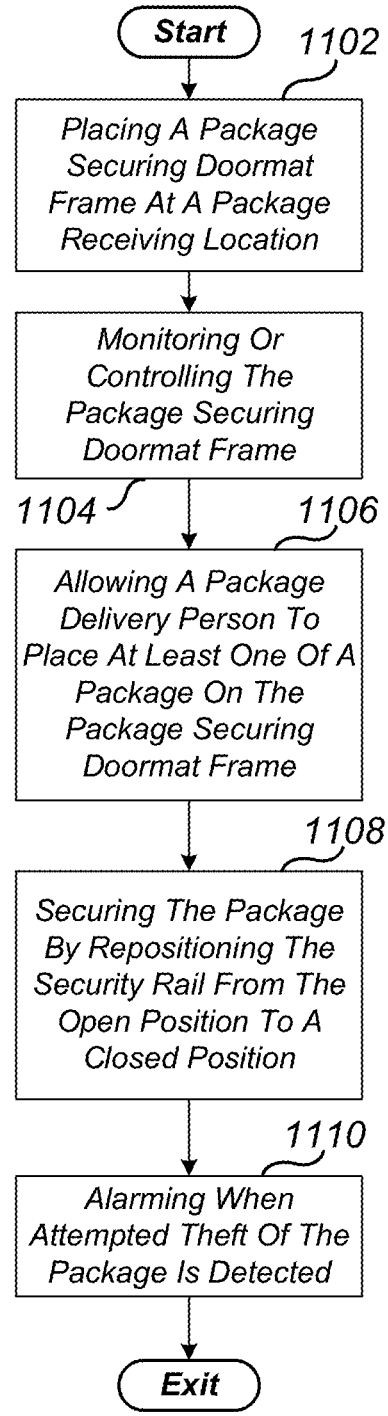

Referring to FIG. 11 there is illustrated one example of a method of protecting packages by way of a package securing doormat frame having a concealed security tarp. In an exemplary embodiment, the method begins in block 1102.

In block 1102 a package securing doormat frame 200 is placed at a package receiving location such as house or business 100. The package securing doormat frame 200 comprises a frame 204, a security rail 218, and a security tarp 214. The frame 204 forms an interior region 224 for receiving at least one of a mat 202. The frame 204 has a recessed chamber 210 along at least portion of the frame 204 perimeter. The securing rail 218 is operationally related to frame 204 and repositionable. The securing rail 218 in an open position is located proximate to the recessed chamber 210, such as illustrated in at least position 'A' of FIG. 6. The method moves to block 1104.

In block 1104, the package securing doormat frame 200 is monitored and/or controlled by way of a web-enabled control system 600. The method moves to block 1106.

In block 1106, a package delivery person 304 is allowed to place at least one of a package 302 on the mat 202. The method moves to block 1108.

In block 1108, the package 302 is secured by repositioning the security rail 218 from the open position to a closed position which extends the security tarp 214 over the package 302 entrapping the package 302 between the interior of the security tarp 214 and the interior region 224. The closed position is illustrated in at least position 'C' of FIG. 6. The security tarp 214 has at least a portion secured to the frame 204 and at least a portion secured by the security rail 218. The method moves to block 1110.

In block 1110 an alarm is initiated when attempted theft of the package 302 is detected. The method is then exited.

Figure 12:
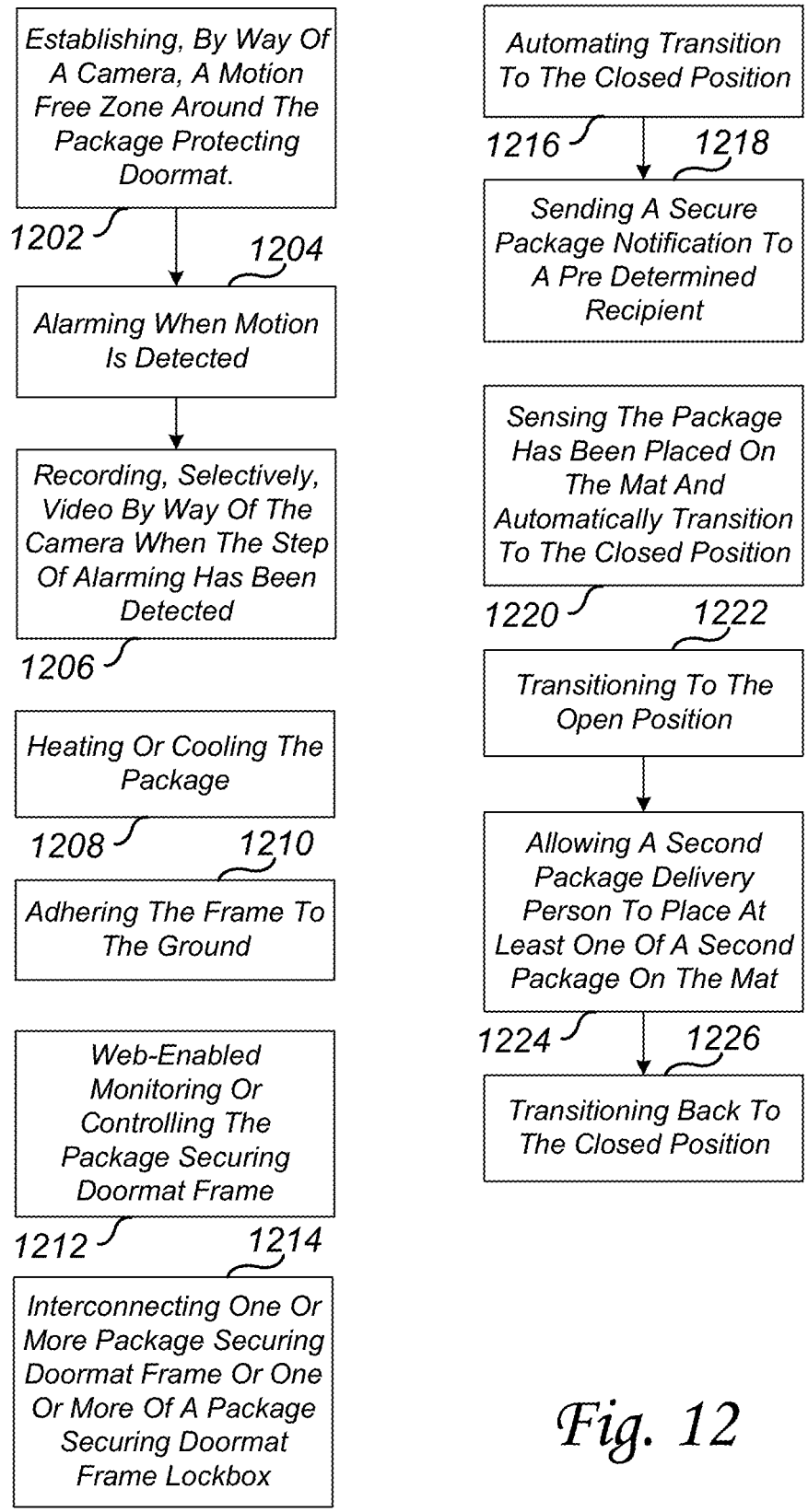
FIG. 12 illustrates exemplary embodiments of a method of protecting packages by way of a package securing doormat frame having a concealed security tarp.

Referring to FIG. 12 there are illustrated exemplary embodiments of a method of protecting packages by way of a package securing doormat frame having a concealed security tarp.

In block 1202 by way of a camera, an optical motion free zone is established around the package securing doormat frame. The method moves to block 1204.

In block 1204, when motion is detected, by way of the camera, within the motion free zone an alarm is initiated. The method moves to block 1206.

In block 1206, selectively, video is recorded by way of the camera when the step of alarming has been detected.

In block 1208, the package 302 is heated and/or cooled by way of a heating system 624 or a cooling system 626.

In block 1210, the frame 204 can be adhered to the ground 102 to prevent the frame 204 from easily being moved.

In block 1212, the package securing doormat frame 200 can be monitored and/or controlled by way of a web-enabled control system 600.

In block 1214, with reference to at least FIGS. 8A, 8B, and 8C, one or more of a second package securing doormat frame 200A and 200B or one or more of a package securing doormat frame lockbox 204C can be interconnected.

In block 1216, transition the security tarp 214 to the closed position can be automated, by way of, using a plurality of sensors 618 to detect the package has been placed on the mat. The method moves to block 1218.

In block 1218, a secure package notification can be sent to a predetermined recipient, by way of, the web-enabled control system 600.

In block 1220, the package 302 having been placed on the mat 202 can be sensed and the security tarp 214 automatically transitioning to the closed position.

In block 1222, the security tarp 214 can be transitioned to the open position, upon receipt of authorization. Such authorization can be sent or otherwise provided by a package delivery person 304 or a courier company, the consumer 306, or remote service center 308. The method moves to block 1224.

In block 1224, such authorization technique is applicable when the package securing doormat frame 200 is already securing at least one of the package 302 to allow a second package delivery person to place at least one of a second package on the mat 202. The method moves to block 1226.

In block 1226, the security tarp 214 is transitioned back to the closed position, securing the package and the second package therein.

Figure 13:
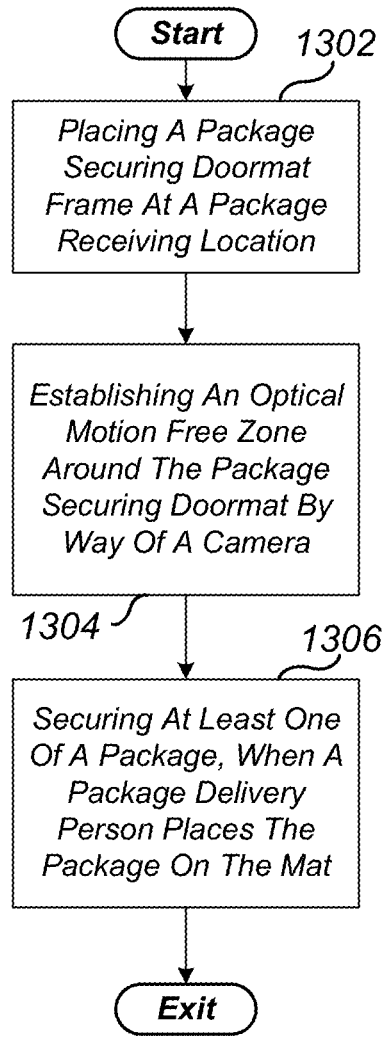
FIGS. 13 and 14 illustrate examples of a method of protecting delivered packages from theft by way of a package securing doormat frame having a concealed security tarp.

Referring to FIG. 13, there is illustrated one example of a method of protecting delivered packages from theft by way of a package securing doormat frame having a concealed security tarp. In an exemplary embodiment, the method begins in block 1302.

In block 1302, a package securing doormat frame is placed at a package receiving location. The package securing doormat frame comprises a frame 204, a securing rail 218, and a security tarp 214, the frame 204 defines an interior region for receiving at least one of a mat 202. The frame 204 has a recessed chamber 210 along at least a portion of the perimeter of the frame 204. The securing rail 218 is operationally related to the frame 204 and repositionable. The securing rail 218, in an open position, is located proximate to the recessed chamber 210. The method moves to block 1304.

In block 1304, an optical motion free zone is established around the package securing doormat by way of a camera. The camera is suitable for use in connection with detecting motion, is web-enabled, and selectively data communicates at least one of a secure package notification to predefined recipients when motion is detected within the optical motion free zone, package delivery or package delivery exception occurs by the package delivery person, or in response to a space-available request, certain of the secure package notification includes data or images from the camera.

The term "secure package notification", in the present invention, is intended to mean emails, text messages, electronic messages, icon indicators that appear on digital devices, database updates, messages sent between servers, and other types and kinds of notifications as may be required and/or desired in a particular embodiment. Such secure package notifications can be sent or otherwise appear at different status milestones in the package delivery process. As an example, when the package delivery person delivers the package, when there is a package delivery exception, or at other milestone points as may be required and/or desired in a particular embodiment.

The term "package delivery exception", in the present invention, is intended to mean a package delivery person is unable to make a scheduled package delivery for reasons such as a required signature from the recipient is unobtainable, the package is damaged in shipping, the delivery address can't be located, or for other reasons. Such package delivery exceptions, when they occur, can cause the generation of communications to predetermined recipients. Such communications can be, for example, and not a limitation, emails, text messages, electronic messages, data communications by way of the package securing system, reschedule deliveries notice generation electronic or physical paper type messages or other types of messages as may be required and/or desired in a particular embodiment. The method moves to block 1306.

In block 1306, at least one of a package 302 is secured, when a package delivery person places the package on the mat 202, by repositioning the securing rail 218 from the open position to a closed position which extends the security tarp 214 over the package 302 entrapping the package 302 between the interior of the security tarp 214 and the interior region of the frame 204. The security tarp 214 having at least a portion secured to the frame 204 and at least a portion secured by the securing rail 218. The method is then exited.

Figure 14:
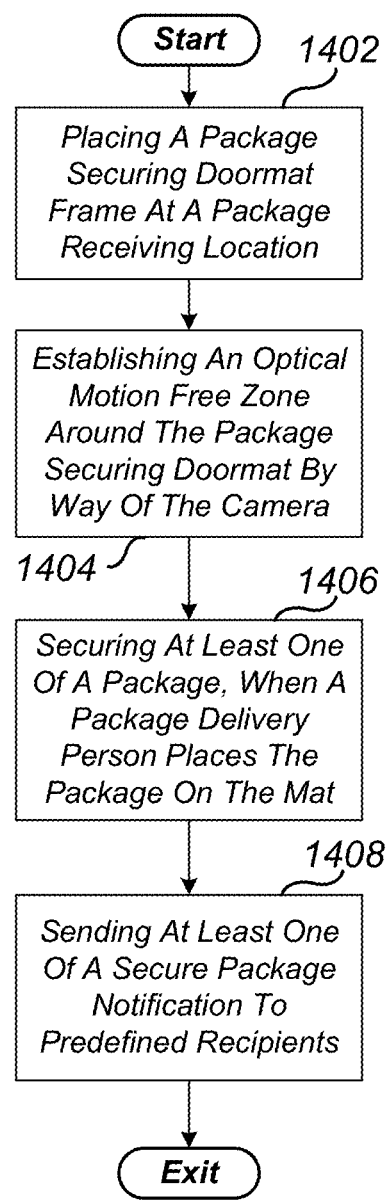

Referring to FIG. 14, there is illustrated one example of a method of protecting delivered packages from theft by way of a package securing doormat frame having a concealed security tarp. In an exemplary embodiment, the method begins in block 1402.

In block 1402, a package securing doormat frame is placed at a package receiving location. The package securing doormat frame comprising a frame 204, a securing rail 218, a security tarp 214, a camera 402/616, and a web-enabled control system 600. The frame defines an interior region for receiving at least one of a mat 202. The frame 204 has a recessed chamber 210 along at least a portion of the perimeter of the frame 204. The securing rail 218 is operationally related to frame 204 and repositionable. The securing rail 218, in an open position, is located proximate to the recessed chamber The method moves to block 1404.

In block 1404, an optical motion free zone is established around the package securing doormat frame, by way of the camera 616 that is suitable for use in connection with detecting motion and operational related to the web-enabled control system 600. The method moves to block 1606.

In block 1406, at least one of a package 302 is secured, when a package delivery person 304 places at least one of the package 302 on the mat 202, by repositioning the securing rail 218 from the open position to a closed position which extends the security tarp over the package 302 entrapping the package 302 between the interior of the security tarp and the interior region of the frame 204. The security tarp 214 has at least a portion secured to the frame 204 and at least a portion secured by the securing rail 218. The method moves to block 1408.

In block 1408, at least one of a secure package notification is sent to predefined recipients, by way of the web-enabled control system 600 or a remote control system that is in data communication with the web-enabled system 600, when motion is detected proximate to the optical motion free zone, package delivery, or package delivery exception occurs by the package delivery person, or in response to a space-available request. Certain of the secure package notifications include data or images from the camera.

Figure 15:
FIG. 15 illustrates exemplary embodiments of a method of protecting delivered packages from theft by way of a package securing doormat frame having a concealed security tarp.

Referring to FIG. 15 there are illustrated exemplary embodiments of a method of protecting delivered packages from theft by way of a package securing doormat frame having a concealed security tarp.

In block 1502, an image of the package securing doormat frame and surrounding area is sent, by way of the camera, in response to a space-available request. In an exemplary embodiment, a space-available request such as an electronic message or command can be data communicated to the web-enabled control system 600, camera 402/616, or other devices as may be required and/or desired in a particular embodiment.

In response to a space-available request request, a camera can send an image of the package securing doormat frame and surrounding area so that the space-available request sender can see if there is space available, within the package securing doormat frame 200, for a package or if, in the alternative, the package securing doormat frame 200 is filled with packages and as such can't accept and secure anymore packages until the recipient opens and removes the current secured packages.

For disclosure purposes, the camera can be an external camera that is operationally related to and/or otherwise positioned to view the package securing doormat frame 200 and surrounding area. Alternatively, the camera can be a camera 616 that is integrated into the package securing doormat frame 200 and configured to view the package securing doormat frame 200 and surrounding area.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A package securing system that protects delivered packages from theft by way of a package securing doormat frame having a concealed security tarp comprising:
   a frame that defines an interior region receives at least one of a mat, the frame having a recessed chamber along at least a portion of the perimeter of the frame;
   a securing rail is operationally related to the frame and repositionable, the securing rail, in an open position, is located proximate to the recessed chamber;
   a security tarp having at least a portion secured to the frame and at least a portion secured by the securing rail, the security tarp is stored in the recessed chamber, when at least one of a package is placed on the mat the package is secured by repositioning the securing rail from the open position to a closed position, the closed position extending the security tarp over the package, securing the package between the interior of the security tarp and the interior region of the frame; and
   a camera that is suitable for use in connection with detecting motion establishes an optical motion free zone around the package securing doormat frame, the camera is web-enabled and selectively data communicates a secure package notification to predefined recipients when motion is detected within the optical motion free zone, when package delivery or package delivery exception occurs by a package delivery person, or in response to a space-available request, wherein at least some of the secure package notification includes data or images from the camera.

2. The package securing system in accordance with claim 1, the securing rail further comprising a security edge and the frame further comprising a security latch wherein the security edge and security latch interlock holding the securing rail in the closed position.

3. The package securing system in accordance with claim 1, the securing rail is shaped and fitted to seal the recessed chamber when the securing rail is in the open position.

4. The package securing system in accordance with claim 1, further comprising:
a security rail locking mechanism is integrated into the frame, the security rail locking mechanism effectuates the ability to lock and unlock the securing rail from the closed position.

5. The package securing system in accordance with claim 1, further comprising:
a security tarp actuator that transitions the securing rail between the open position and the closed position.

6. The package securing system in accordance with claim 1, wherein the frame is interconnected with one or more of a second package securing doormat frame or one or more of a package securing doormat frame lockbox.

7. The package securing system in accordance with claim 1, further comprising:
a heating system or a cooling system integrated into the frame to keep the package warm or cold.

8. The package securing system in accordance with claim 1, further comprising:
an adhesive applied to the frame for securing the frame to the ground, making the frame more difficult to move; or
a tether having a first end attached to the frame and a second end that is securable behind closed door or window.

9. The package securing system in accordance with claim 1, further comprising:
a web-enabled control system is operationally related to at least one of the following: the camera, the frame, or the securing rail for remotely monitoring and selectively controlling the package securing system.

10. The package securing system in accordance with claim 1, further comprising:
a plurality of sensors automates transition to the closed position when the package is detected as having been placed on the mat.

11. A method of protecting delivered packages from theft by way of a package securing doormat frame having a concealed security tarp, the method comprising the steps of:
placing a package securing doormat frame at a package receiving location, the package securing doormat frame comprising a frame, a securing rail, and a security tarp, the frame defines an interior region for receiving at least one of a mat, the frame having a recessed chamber along at least a portion of the perimeter of the frame, the securing rail is operationally related to the frame and repositionable, the securing rail, in an open position, is located proximate to the recessed chamber;
establishing an optical motion free zone around the package securing doormat by way of a camera that is suitable for use in connection with detecting motion, web-enabled, and selectively data communicates a secure package notification to predefined recipients when motion is detected within the optical motion free zone, when package delivery or package delivery exception occurs by the package delivery person, or in response to a space-available request, wherein at least some of the secure package notification includes data or images from the camera; and
securing at least one of a package, when a package delivery person places the package on the mat, by repositioning the securing rail from the open position to a closed position which extends the security tarp over the package entrapping the package between the interior of the security tarp and the interior region of the frame, the security tarp having at least a portion secured to the frame and at least a portion secured by the securing rail.

12. The method in accordance with claim 11, further comprising the steps of:
sending an image of the package securing doormat frame, by way of the camera, in response to the space-available request.

13. The method in accordance with claim 11, further comprising the step of:
heating or cooling the package by way of a heating system or a cooling system.

14. The method in accordance with claim 11, further comprising the step of:
recording, audio and video by way of the camera when the motion is detected within the optical free zone.

15. The method in accordance with claim 11, further comprising the step of:
monitoring or controlling the package securing system by way of a web-enabled control system, the web-enabled control system is operationally related to at least one of the following: the camera, the frame, or the securing rail.

16. The method in accordance with claim 15, further comprising the steps of:
automating transition to the closed position by way of using a plurality of sensors to detect the package has been placed on the mat; and
sending the secure package notification to a predetermined recipient by way of the web-enabled control system.

17. The method in accordance with claim 11, further comprising the step of:
interconnecting the frame to one or more of a second package securing doormat frame or one or more of a package securing doormat frame lockbox.

18. The method in accordance with claim 11, further comprising the step of:
sensing, by way of a plurality of sensors, the package has been placed on the mat and in response automatically transitioning the securing rail to the closed position.

19. The method in accordance with claim 11, further comprising the steps of:
transitioning the securing rail to the open position, upon receipt of an authorization from a web-enabled control system, when the package securing doormat frame is already securing at least one of the package to allow a second package delivery person to place at least one of a second package on the mat; and
transitioning the securing rail back to the closed position, securing the package and the second package.

20. A method of protecting packages from theft by way of a package securing doormat frame having a concealed security tarp, the method comprising the steps of:
placing a package securing doormat frame at a package receiving location, the package securing doormat frame comprising a frame, a securing rail, a security tarp, a camera, and a web-enabled control system, the frame defines an interior region for receiving at least one of a mat, the frame having a recessed chamber along at least a portion of the perimeter of the frame, the securing rail is operationally related to the frame and repositionable, the securing rail, in an open position, is located proximate to the recessed chamber;

establishing an optical motion free zone around the package securing doormat frame, by way of the camera that is suitable for use in connection with detecting motion and operational related to the web-enabled control system;

securing at least one of a package, when a package delivery person places at least one of the package on the mat, by repositioning the securing rail from the open position to a closed position which extends the security tarp over the package entrapping the package between the interior of the security tarp and the interior region of the frame, the security tarp having at least a portion secured to the frame and at least a portion secured by the securing rail; and sending at least one of a secure package notification to predefined recipients, by way of the web-enabled control system, when motion is detected proximate to the optical motion free zone, when the package is delivered or package delivery exception occurs by the package delivery person, or in response to a space-available request, wherein at least some of the secure package notification includes data or images from the camera.

* * * * *